INVENTORS:
ROBERT H LAWSON,
ARTHUR N CLOUTIER,
BY Roy F. Lovel
ATT'Y.

June 6, 1939.  R. H. LAWSON ET AL  2,161,067
SPLIT-FOOT KNITTING MACHINE AND METHOD
Filed April 8, 1936   12 Sheets-Sheet 2
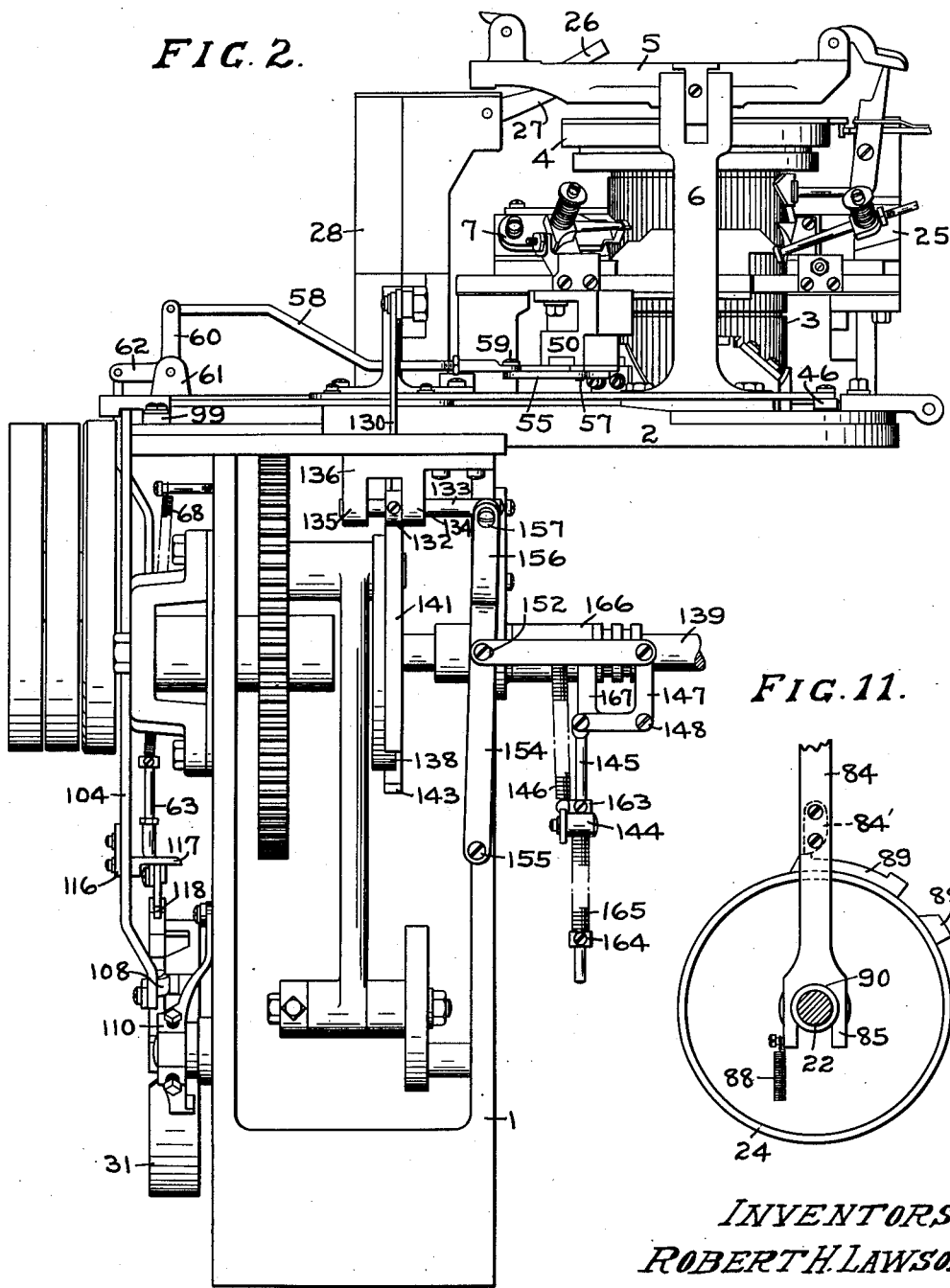
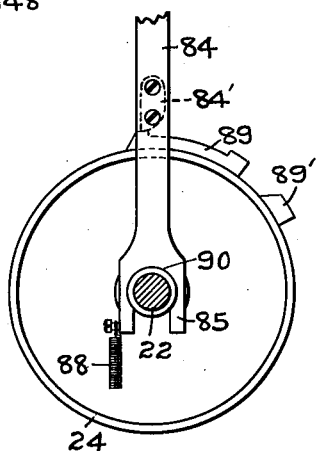
INVENTORS:
ROBERT H. LAWSON,
ARTHUR N. CLOUTIER,
By Roy F. Lovell
ATT'Y.

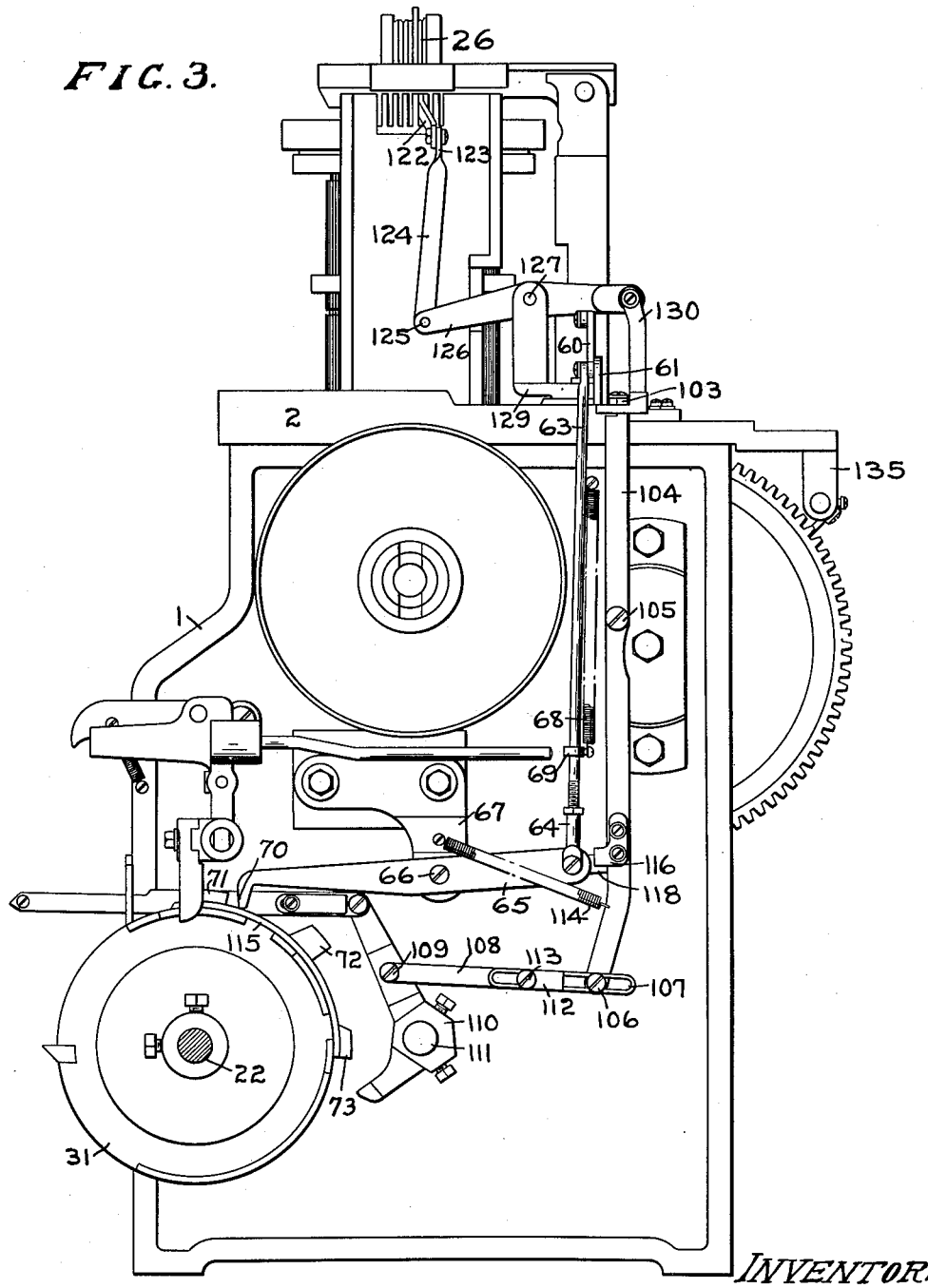

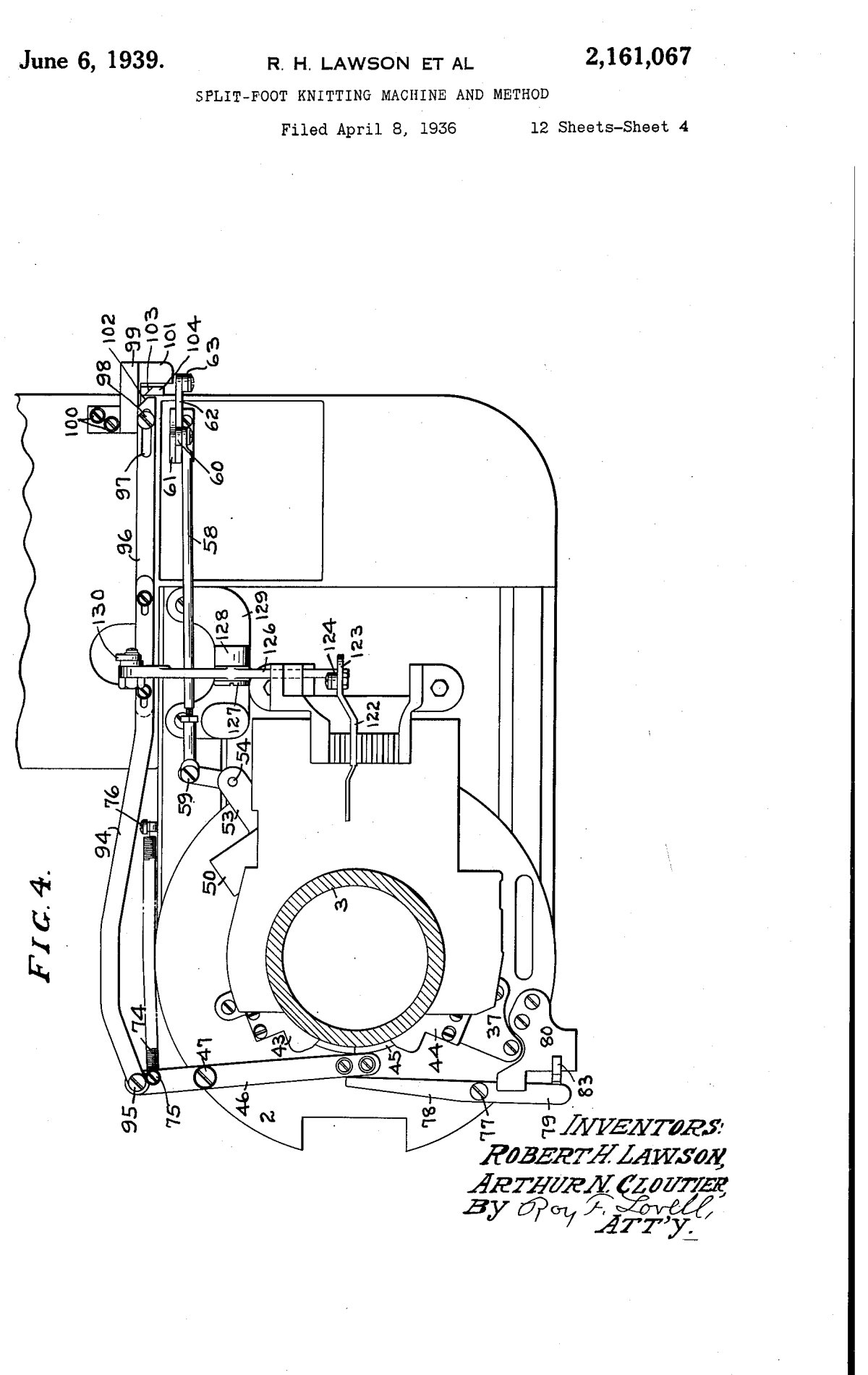

June 6, 1939.   R. H. LAWSON ET AL   2,161,067
SPLIT-FOOT KNITTING MACHINE AND METHOD
Filed April 8, 1936   12 Sheets-Sheet 4

FIG. 4.

INVENTORS:
ROBERT H. LAWSON,
ARTHUR N. CLOUTIER,
BY Roy F. Lovell,
ATT'Y.

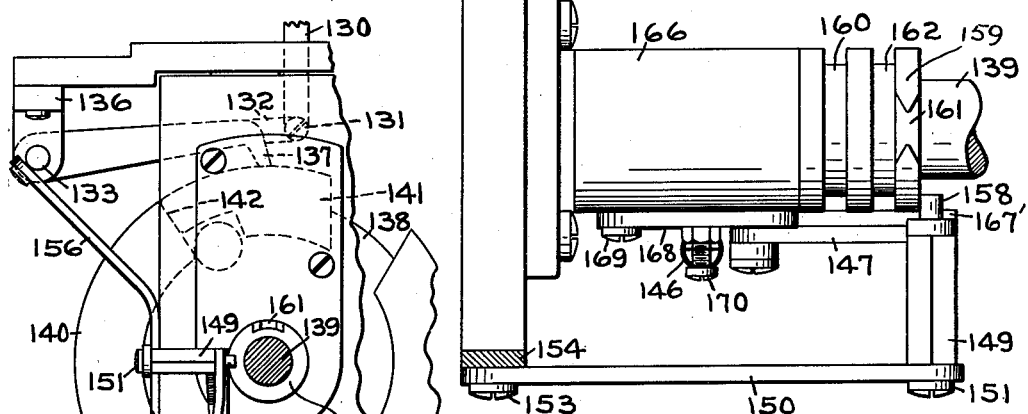
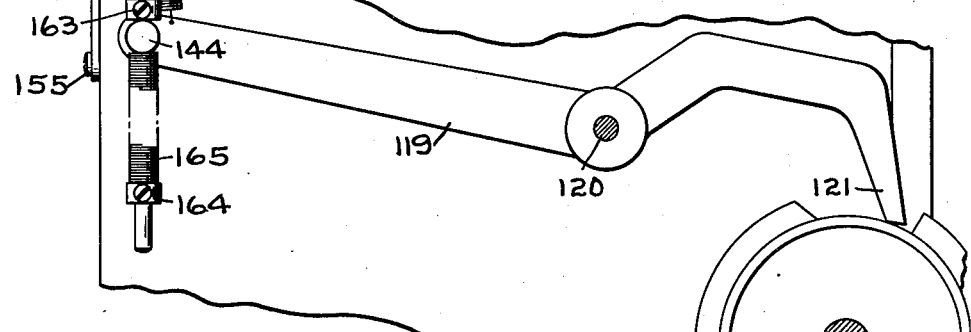
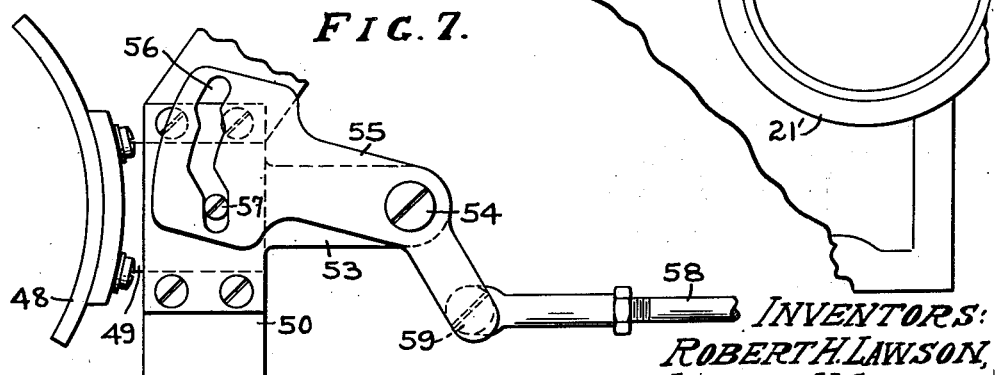

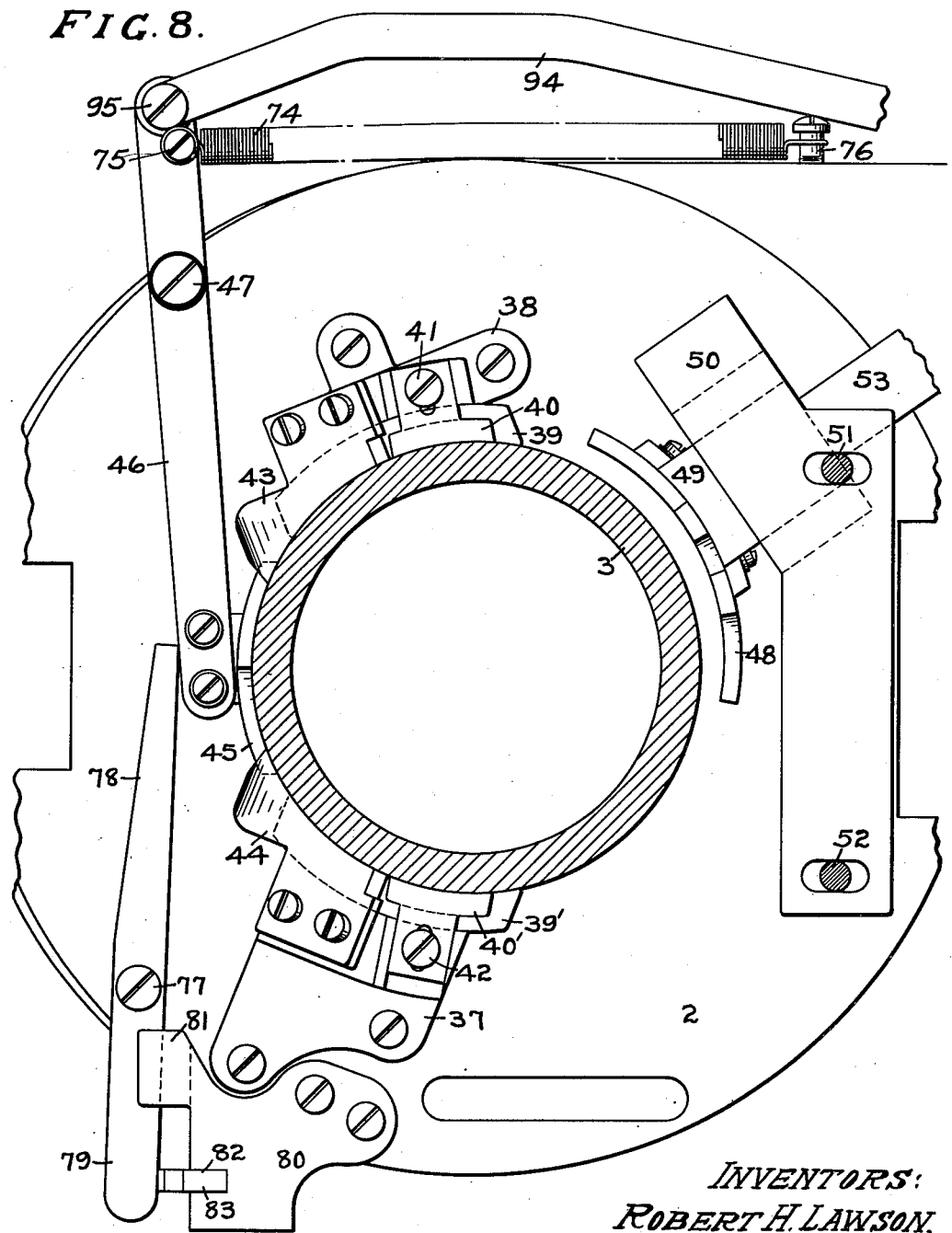

June 6, 1939.      R. H. LAWSON ET AL      2,161,067
SPLIT-FOOT KNITTING MACHINE AND METHOD
Filed April 8, 1936      12 Sheets-Sheet 7

INVENTORS:
ROBERT H. LAWSON,
ARTHUR N. CLOUTIER,
By Roy F. Lovell,
ATT'Y.

June 6, 1939.　　　R. H. LAWSON ET AL　　　2,161,067
SPLIT-FOOT KNITTING MACHINE AND METHOD
Filed April 8, 1936　　12 Sheets-Sheet 8

INVENTORS:
ROBERT H. LAWSON,
ARTHUR N. CLOUTIER,
By Roy F. Lovell,
ATT'Y.

June 6, 1939.   R. H. LAWSON ET AL   2,161,067
SPLIT-FOOT KNITTING MACHINE AND METHOD
Filed April 8, 1936   12 Sheets-Sheet 9

INVENTORS:
ROBERT H. LAWSON,
ARTHUR N. CLOUTIER,
BY Roy F. Lovell
ATT'Y.

June 6, 1939.  R. H. LAWSON ET AL  2,161,067
SPLIT-FOOT KNITTING MACHINE AND METHOD
Filed April 8, 1936  12 Sheets—Sheet 10

INVENTORS:
ROBERT H. LAWSON,
ARTHUR N. CLOUTIER,
By Roy F. Lovell,
ATT'Y.

June 6, 1939.  R. H. LAWSON ET AL  2,161,067

SPLIT-FOOT KNITTING MACHINE AND METHOD

Filed April 8, 1936   12 Sheets-Sheet 11

INVENTORS:
ROBERT H. LAWSON,
ARTHUR N. CLOUTIER,
By Roy F. Lovell,
ATT'Y.

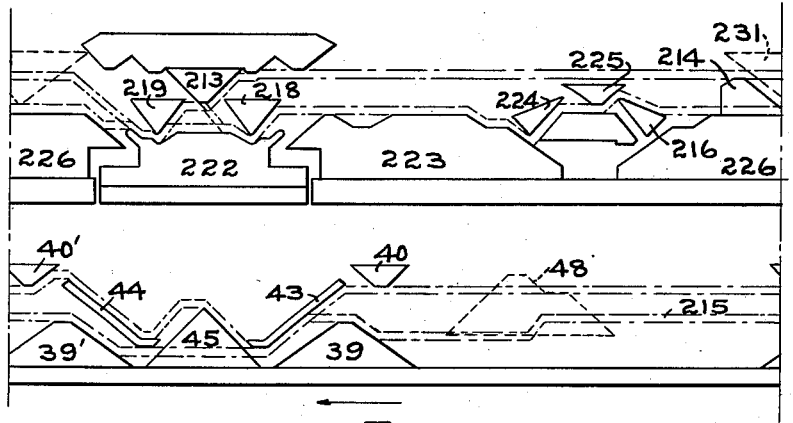
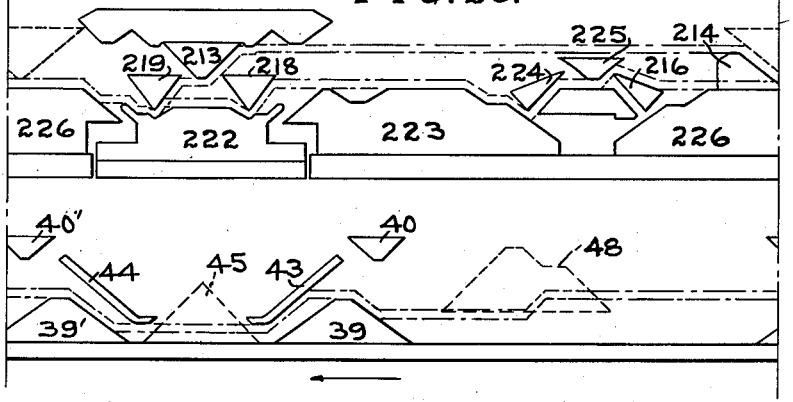
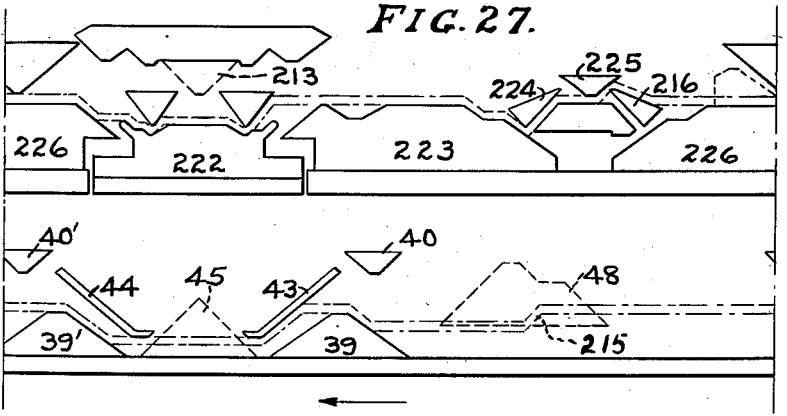

Patented June 6, 1939

2,161,067

UNITED STATES PATENT OFFICE 2,161,067

SPLIT-FOOT KNITTING MACHINE AND METHOD

Robert H. Lawson, Pawtucket, and Arthur N. Cloutier, Lonsdale, R. I., assignors to Hemphill Company, Central Falls, R. I., a corporation of Massachusetts Application April 8, 1936, Serial No. 73,325
In Canada April 10, 1935

21 Claims. (Cl. 66—43)

This case deals with a new method of knitting split-foot stockings and the machine for practicing this new method.

In the drawings:

Fig. 2 shows part of the rear side of the machine and certain of the novel mechanism with which the case is concerned;

Fig. 3 is an elevation showing one side of the new machine;

Fig. 4 is a plan view showing a section taken transversely through the needle cylinder and illustrating some of the parts which operate the jack cams;

Fig. 5 is a fragmentary view illustrating the control for operating the reinforcing lever;

Fig. 6 is a detail view showing the cam control for engaging and disengaging the reinforcing lever with its cam;

Fig. 7 is a detail view of the operating means which is associated with one of the jack cams;

Fig. 8 is a sectional view taken through the needle cylinder immediately above the jack controlling cams and illustrating these cams in detail;

Fig. 11 is a detail view showing the cams and controlling means associated therewith for the eyelet closing cam;

Figure 28:
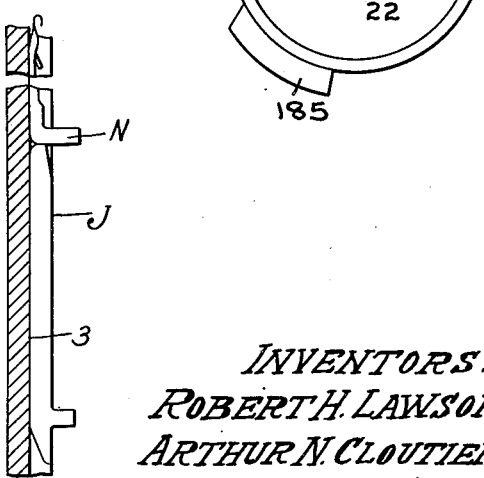
Figure 20:
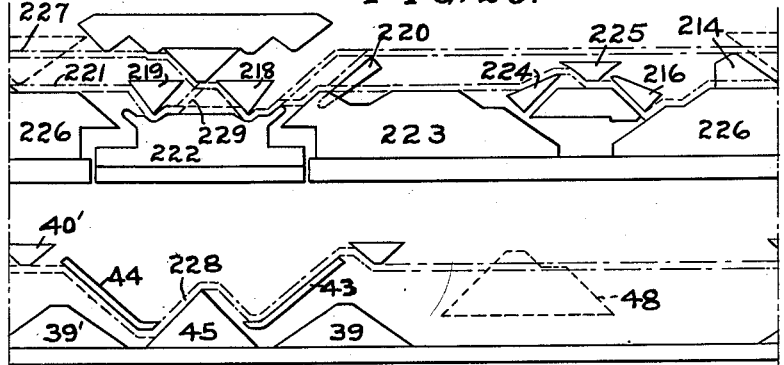
Fig. 20 is a diagrammatic view showing the pathways of needles and jacks during knitting the high-splice.
Figure 21:
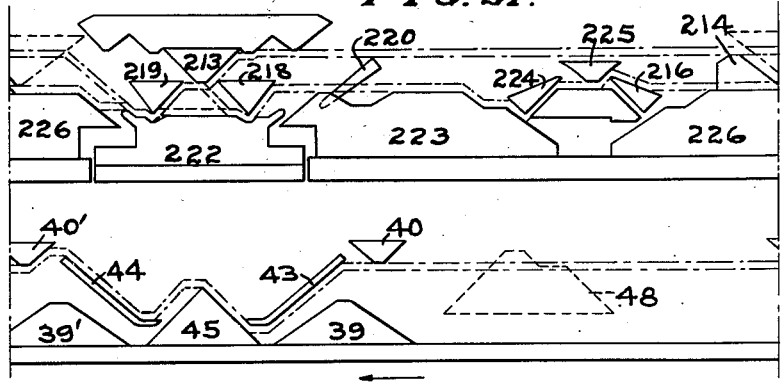
Figure 22:
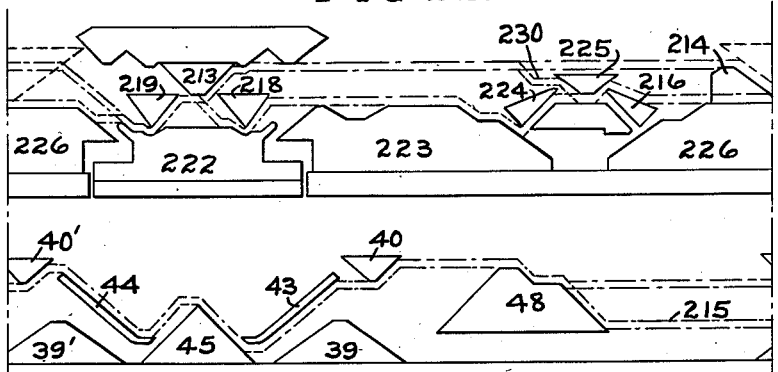
Figure 23:
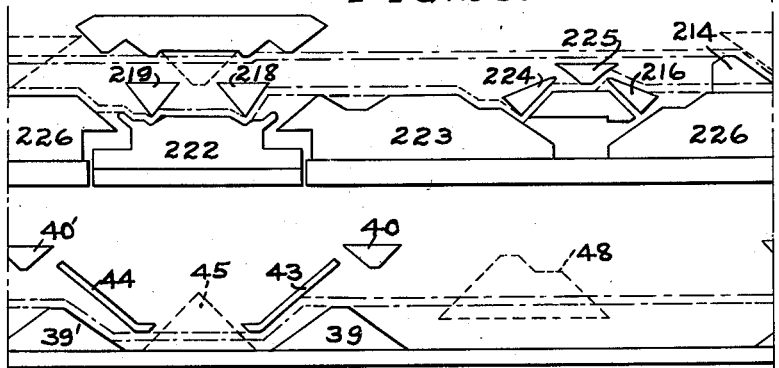
Figure 24:
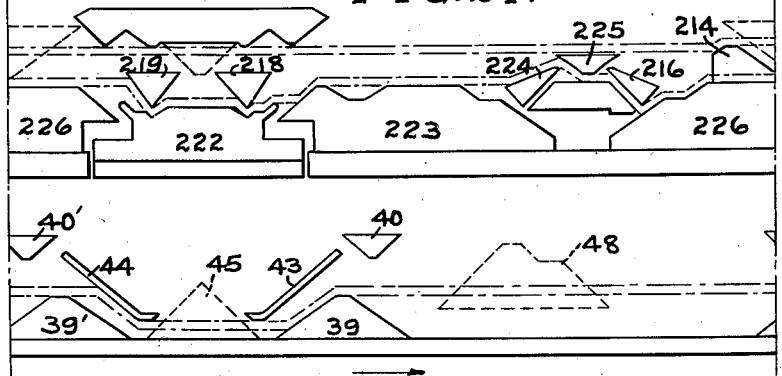

Fig. 21 corresponds to Fig. 20 but shows the reverse reciprocation;

Fig. 22 is a diagrammatic view illustrating cam control of jacks upon starting knitting of a heel according to the invention, and shows the pathway of needles and jacks during such portion of the cycle;

Figs. 23 and 24 illustrate diagrammatically the pathway of needles and jacks during both directions of reciprocation in the heel;

Fig. 25 illustrates diagrammatically the pathway which needles and jacks take throughout the foot;

Fig. 26 is a diagrammatic view showing operation of needles and jacks, as well as position of cams while knitting the so-called bunion patch;

Fig. 27 is a diagrammatic view showing the pathway of needles and jacks during the knitting of the ring top, ring toe, etc., and Fig. 28 shows in detail one of the needles and needle controlling jacks.

Split-foot knitting machines have been extremely complicated in their construction and mode of operation, especially whenever it has been desired to knit on such machines stockings having the suture line spaced from the normal center line of the stocking such as might be determined by an equal distribution of long and short butt needles. The problem of knitting a split-foot stocking wherein the suture line will not occur at the wales which would normally be knitted by the terminal long and short butt needles has made it necessary to resort to the use of jacks whereby some of the needles in one group might be forced to knit with the needles of the opposite group throughout certain portions of the stocking such as in the high-splice and sole. Good practice according to the present construction of split-foot hosiery calls for knitting the heel with the corner thereof spaced a few needles from the suture line. If both of these advantages are to be incorporated in the same stocking the machine must necessarily have jacks with butts of two different lengths. The split-foot machines which have been capable of producing such a stocking have been very complicated, both as to the multiplicity of parts therein and in the great number of moves necessary for forcing these parts to function in the proper manner and at the proper time. Examples of split-foot knitting machines according to the prior art, which knit such a stocking are evident in U. S. application Serial Number 439,976, now Patent #2,083,027 and U. S. application Ser. No. 36,563. These cases are referred to for the general construction of a split-foot knitting machine wherein it is possible to control needle jacks having butts of two contrasting lengths to knit a stocking of the type concerned.

The machines according to applications herein made of record and according to the present case are of the type wherein the leg and instep of the stocking are formed from a single yarn, this yarn being knitted preferably at the auxiliary side of the machine. The advantages of knitting a split-foot stocking in this manner are too well known to require further comment at this time. It is possible by means of varying the number of long and short butt jacks to control the size of high-splice which will be knitted and also to make the suture line along the sole at any desired height. The high-splice may be wider or narrower than the sole portion if desired, and either high-splice or sole may be knitted without the use of jacks if such a stocking should be in demand. The change may be quickly brought about by means of placing a few jacks in the machine having long and short butts according to the set-up which is desired.

It has been found desirable at times to reinforce the high-splice and/or top of toe throughout a narrow area and this is done by means of a so-called, jumping finger. In this case we have disclosed a new mechanism for controlling the finger which is to feed this extra reinforcing yarn to the high-splice and/or toe.

Figure 15:
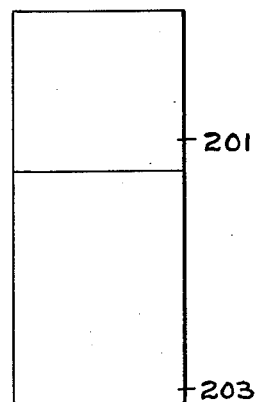
Fig. 15 is a view illustrating a stocking made in accordance with the invention.

The invention is described with reference to a machine having a set-up which is adapted to knit a stocking of the type shown herein in Fig. 15, but it is to be understood that this is given by way of illustration only and that the machine is in no way limited to the production of a stocking according to a particular one illustrated, but with slight variations of set-up of jacks and pattern drums for controlling cams, all within the skill of the knitter, many variations of this general class of split-foot stocking may be produced.

Figure 1:
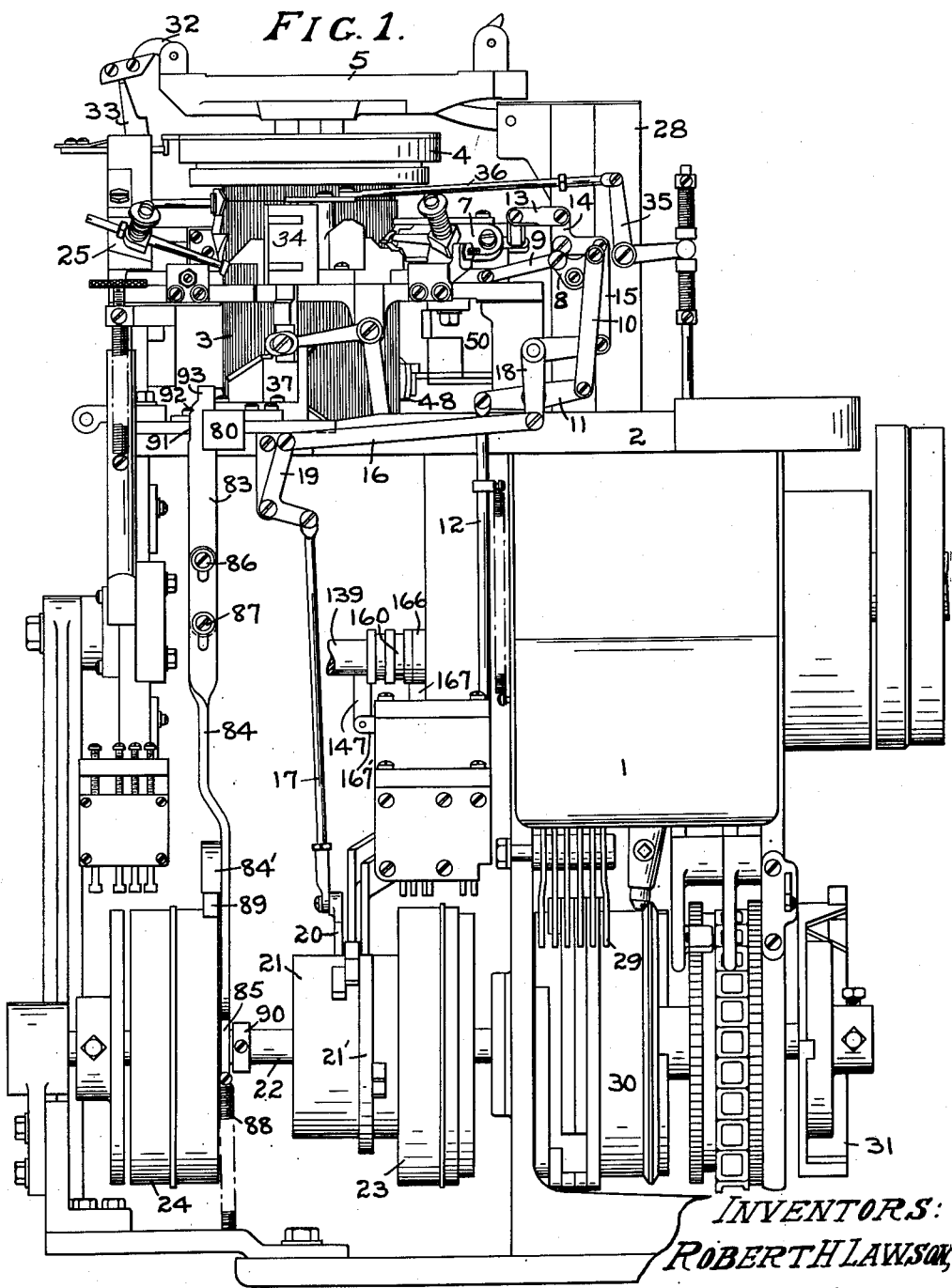
Fig. 1 is a general view showing the front of a knitting machine constructed according to the present invention.

The machine itself and the changes which have been made over the machine of the prior art will be described after which the operation of this machine will be taken relative to making a complete stocking similar to the one shown in Fig. 15. Referring to Figs. 1 and 2 the machine consists of a frame 1, a circular base 2, needle cylinder 3 and associated therewith needles of the latch type and a sinker head 4 in which the usual sinkers operate in conjunction with the needles to form a knitted fabric. Referring to Fig. 28 a typical latch needle N and a needle controlling and selecting jack J are shown. These needles and jacks are slidable within the needle tricks in the cylinder according to the usual practice. A latch ring 5 is hinged to swing about a pivot on the post 6. A main cam set is located in the usual position and is generally designated by numeral 7, this cam set being of standard construction and not different from that shown in the cases previously mentioned. This cam block carries the usual narrowing cams and is arranged to be withdrawn from active position by means of a bell crank 8, links 9 and 10, lever 11 and rod 12 connected to a lever (not shown) which is moved by suitable cams to withdraw this cam block and allow it to return to position at the proper time. One of the knitting cams in this main cam set is arranged to be withdrawn from active position during the knitting of certain parts of the stocking, such as when knitting the leg. This cam has an extension in the form of a stem at which is pivoted a short link 13 connected to a bell crank lever 14 which is operated at the proper times by means of the links 15, 16 and 17 and the bell crank levers 18 and 19. The vertically extending link 17 attaches at its lower end to a lever 20 which engages certain cams on cam drum 21 fixed to the main cam shaft 22.

This main cam shaft also has drums 23 and 24 rotatable therewith which operate to raise and lower the main cam set 7 and the auxiliary cam set, herein generally indicated by numeral 25, respectively. This vertical movement of the cam assemblies provides for varying the length of stitch, thus fashioning the stocking. The usual yarn feeding fingers cooperate to feed yarn at the main side of the machine and are generally indicated by numeral 26. These fingers are controlled by the usual levers 27 pivoted in the upper end of an enclosure 28 and which are connected by suitable wires or the like to a series of fingers 29 which bear upon certain cams on a cam drum 30. Cam drum 30 also carries the usual cam for changing the motion of the cylinder from a rotary to a reciprocatory one, and this cam shaft 22 also carries the usual ratchet, sprocket for the pattern chain and a cam drum 31 at the extreme end thereof for actuating the stopping mechanism.

The auxiliary cam block indicated at 25 is also arranged to be withdrawn bodily from the cylinder so that it will be out of the way when transferring; also, the center cam is individually provided with means whereby it may be withdrawn from active position at such times as when knitting the heel and toe. This cam block carries the usual widening picks. This auxiliary side of the machine has been provided with a single yarn guide indicated at 32 and which is controlled by means of a lever 33 which lever also functions to withdraw the center sinker cam on this side of the machine at certain predetermined times and to allow it to remain in active position at other specified times. The machine is provided with an instep cam assembly 34, the lower instep cam of which is operated to function whenever the machine is operated in a reciprocatory manner and is withdrawn from an active position at other times. The top instep cam is separately moved to and from position by means of a lever 35, link 36 and other connections to the pattern controlling members on the machine all of which are described and claimed in U. S. application Ser. No. 36,563.

The needles which are used in the machine illustrated are preferably of the latch type but may be spring beard needles in which case pressers will be used, the invention depending in no way upon the type of needles used. The entire assembly of needles is divided into two groups, one group having long butts and the other group having short butts. These groups preferably contain equal numbers of needles but it is not necessary to divide the long and short butt needles equally since it might be advisable in some circumstances to provide more or less of either kind of needles. The long butt needles are used for knitting the instep, as is the usual practice, while the short butts function in the heel, toe and sole portions during reciprocatory work except in certain instances hereinafter to be described. A few of the short butt needles adjacent the long butt needles are provided with jacks, and for purposes of illustration, it will be assumed that 12 short butt needles at either extremity of the short butt group are provided with these jacks and that 9 of the jacks have long butts and that 3 of the jacks have short butts in each group. The jacks having long butts are those under the short butt needles which are closest to the long butt needles.

This particular set-up of jacks and needles is merely given as an example of one set-up which is commonly used in making such stockings as we have illustrated, but the invention is in no way limited to any particular number of jacks used nor to any particular division of these jacks into long and short butts. This all depends upon the number of needles which it is desired to use for knitting the high-splice and for knitting the sole, also how far it is desired to space the corner of the heel from the suture line formed between split portions of the fabric. The same set-up of jacks and needles has been used in this case which was taken as an example in U. S. application Ser. No. 36,563 so that the two cases may be compared and that the simplicity of this machine will be evident when it is considered that both machines may produce the same stocking.

Figure 9:
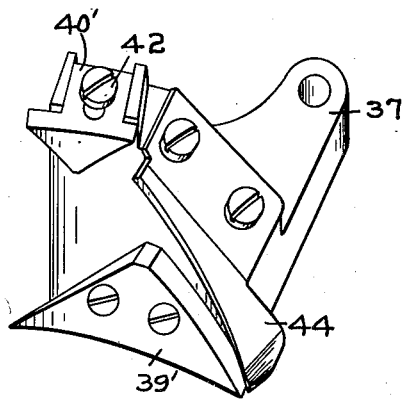
Fig. 9 is a perspective view showing the front jack cam assembly.
Figure 10:
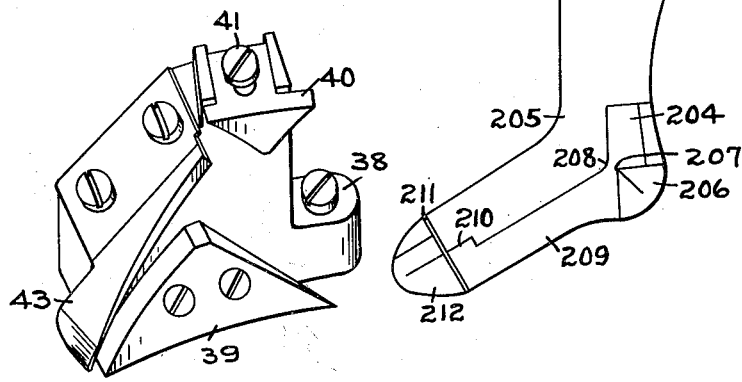
Fig. 10 is a corresponding view of the opposite jack cam assembly.
Figure 14:
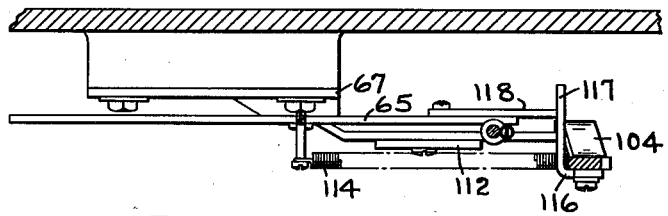
Fig. 14 is a sectional view illustrating some of the mechanism shown in Figs. 12 and 13 as seen from above.
Figure 19:
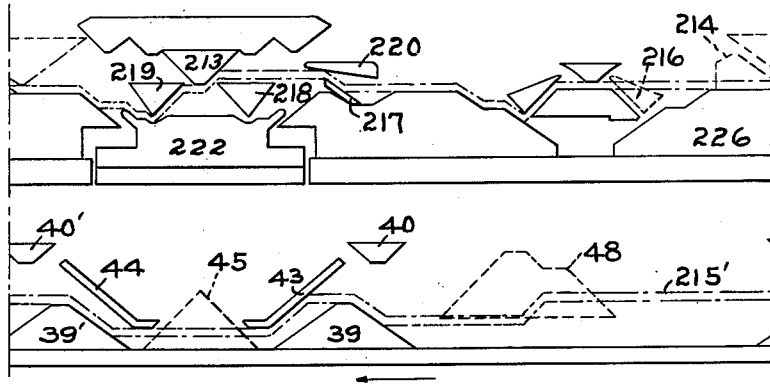
Fig. 19 is a diagrammatic view showing the path of needles and jacks during knitting the leg of the stocking.

Referring to Figs. 4, 8, 9 and 10 the cams which function to control jacks and parts of the mechanism which operate these cams have been shown. These cams are also illustrated in the diagrammatic views 19 through 27. At approximately the front and back of the machine we have provided brackets 37 and 38 which have been attached to the circular base and to these brackets are adjustably fixed cams which function to control jacks in a particular manner according to selections, so-called, by means of two movable jack cams. Cams 39 and 39' are attached to said brackets by means of suitable screws or other attaching means. As shown in Figs. 9, 10 and 19 these cams are triangular in shape and are of a height sufficient to raise the jacks to a level at which they will contact cams 43 and 44 and be lowered thereby or will also be raised to a height to engage cam 48. Two cams 40 and 40' are adjustably attached to the brackets by means of screws 41, 42 passing through slots in the stems of said cams. These cams lower jacks which have been raised by cams 43, 44 so that they will pass below these cams on the reverse stroke. The cams 43 and 44 are attached to said brackets in an inclined position by means of suitable connecting means. These cams are illustrated in profile in Fig. 19 and are inclined throughout a portion of their extent but have short horizontal extensions at the lower end thereof. These cams will lower jacks which have been raised by cams 39 and 39' or which have been traveling in a pathway wherein they were raised by either of the movable jack cams. In the event that movable cam 45, known as the eyelet closing cam is in position to engage jack butts, those jacks which are engaged will be raised up beyond the lower edges of the cams 43 and 44 so that they will be elevated along the inner or upper surfaces of said cams.

If the jack butts pass through the machine and are not engaged by any of the movable jack cams, these jacks will merely pass up over cams 39 and 39' and under cams 43 and 44 in which pathway the jacks will have no effect upon needles. For certain purposes which will be described later with reference to the operation of the machine in knitting a complete stocking, the eyelet closing cam 45 is fixed to the end of a lever 46 which is pivoted at 47 to the circular base of the machine and is controlled by two entirely separate means for engaging long butt jacks at certain times and both long and short butt jacks at other times, while being held in idle position to engage no jacks when knitting certain parts of a stocking. Another cam, herein referred to as the double-step jack cam 48, is attached to a stem 49 which is radially slidable in a guide or bracket 50. This guide 50 is clamped under the cam plate by means of bolts 51 and 52 which pass through slots in said guide or an extension thereof. These slots provide for a certain amount of adjustment whereby the cam may be positioned properly relative to the needle cylinder. The guide or bracket has an extension 53 to the outer end of which is pivoted at 54 a bell crank lever 55 having a cam slot 56 arranged to engage a pin 57 which is threaded within the stem 49. A link 58 is pivoted to the opposite end of said bell crank lever at 59 and according to certain cams upon cam drum 31, this bell crank lever will be swung throughout a sufficient angle to project cam 48 inward to one of two positions.

The link 58 extends to one side of the machine and is connected to an upright arm 60 of a bell crank lever pivoted to a bracket 61 fixed to the circular base of the machine. This bell crank lever and bracket are shown in Figs. 2, 3 and 4. Another arm of said bell crank lever extends horizontally at 62 and a rod 63 is attached to the end of arm 62 and by means of an adjustable connection 64, is pivoted to one end of a lever 65 which rotates about pin 66 in a bracket 67 which is attached permanently to the side of the machine frame. A spring 68 is attached at its lower end to an adjustable collar 69 on the rod 63 and is also fixed at its upper end to a pin projecting from the frame of the machine. This spring is under sufficient tension to maintain the rod 63, lever 65, bell crank 59 and cam 48 in a position in which said cam will not engage any jack butts except when the toe 70 of lever 65 rides up on one of cams 71, 72 or 73 all projecting from the outer rim of cam drum 31. Certain of these cams are low enough to project cam 48 to a position in which it will engage long butts only, while others may project said cam into a position wherein it will engage all jack butts; the particular disposition of cams for the functioning of jack cam 48 for knitting a stocking such as has been illustrated will be described later.

The eyelet closing cam 45 is fixed to the end of lever 46 which was pivoted to swing about a pin 47 all as described in preceding paragraphs. A spring 74 is connected at 75 to the outer end of lever 46 and at its opposite extremity, is attached to a pin 76 projecting from the circular base. This spring is under tension and except when one of the controlling means presses cam 45 into engagement with the cylinder wherein it will contact and raise all jack butts, or to a position in which it will act upon long butts only, this spring will serve to move said eyelet closing cam to an inactive position. A short lever has been pivoted on the circular base to swing about a pivot 77, one end 78 of this lever extending inwardly to engage lever 46, and the other end 79 projecting outwardly as illustrated in Figs. 4 and 8. A bracket 80 is attached by suitable screws to the circular base and serves two purposes, first, that of guiding the outer end 79 of the last mentioned lever by means of the projection 81 which extends over said lever, and secondly, has a slot 82 which provides for restraining and guiding the upper end 83 of a two part controlling member for cam 45. The lower portion 84 of this two-part member is forked at its lower end 85 to straddle the shaft 22, Figs. 1 and 11, and is adjustably connected by means of screws 86, 87, threaded into one part, but passing through slots in the other whereby a suitable adjustment may be obtained. A spring 88 attaches at the lower end of the part 84 and also to some fixed portion of the frame. This spring will urge the two-part member into a lowermost position except when a follower 84' fixed at about the mid-portion of element 84 engages upon cams 89 or 89' on drum 24, better shown in Fig. 11, and having surfaces disposed at two different heights. A collar 90 is fixed to the shaft 22 so that the element 84 will be held in a position such as shown in Fig. 1 wherein follower 84' can not fail to engage its cams.

The upper end of element 83 has been formed in such a manner that it will present one of three different steps, 91, 92 or 93, against the outer end 79 of the lever which pushes cam 45 into position against the resistance of spring 74. The step 91, when a cam 89 or 89' of maximum height engages under follower 84', will push eyelet closing cam 45 inwardly to full extent; in this position it engages jack butts of all lengths. Step 92 provides for pushing the eyelet closing cam inwardly to engage long butt jacks, but to miss short butt jacks; at this time follower 84' must be riding upon a low part of cam 89. At all other times when the follower does not engage any cams on drum 24, the step 93 will allow lever 46 and its cam 45 to move to an inactive position. This constitutes one complete mechanism for controlling the eyelet closing cam but is to be used only during certain phases of knitting a stocking, and another means complete in itself will function at other times to control said eyelet closing cam. This is due to the fact that it is not desirable, although it has been found necessary in previous machines, to provide an extra move for the main cam shaft on which drum 24 is mounted.

Referring to Figs. 2, 3 and 4, the eyelet closing cam may be controlled by means of a two-part member which is comprised of a portion 94 pivoted to lever 46 at 95 and a portion 96 which forms an adjustable extension of 94. One of the members is slotted for the reception of screws which are threaded within the other, and this provides for the necessary adjustment as to the length of this two-part controlling element. Part 96 is slotted at 97 and this end of the bar is maintained in proper position on an extension of the circular base by means of a shoulder screw 98. The bar is free to move lengthwise since the slot 97 is a working fit upon a shoulder screw 98. A bracket 99 is attached by means of screws 100 to the circular base extension and has an angular projection 101 which extends behind the end of bar 96 to limit the movement thereof in a direction towards the right of Fig. 4.

Figure 12:
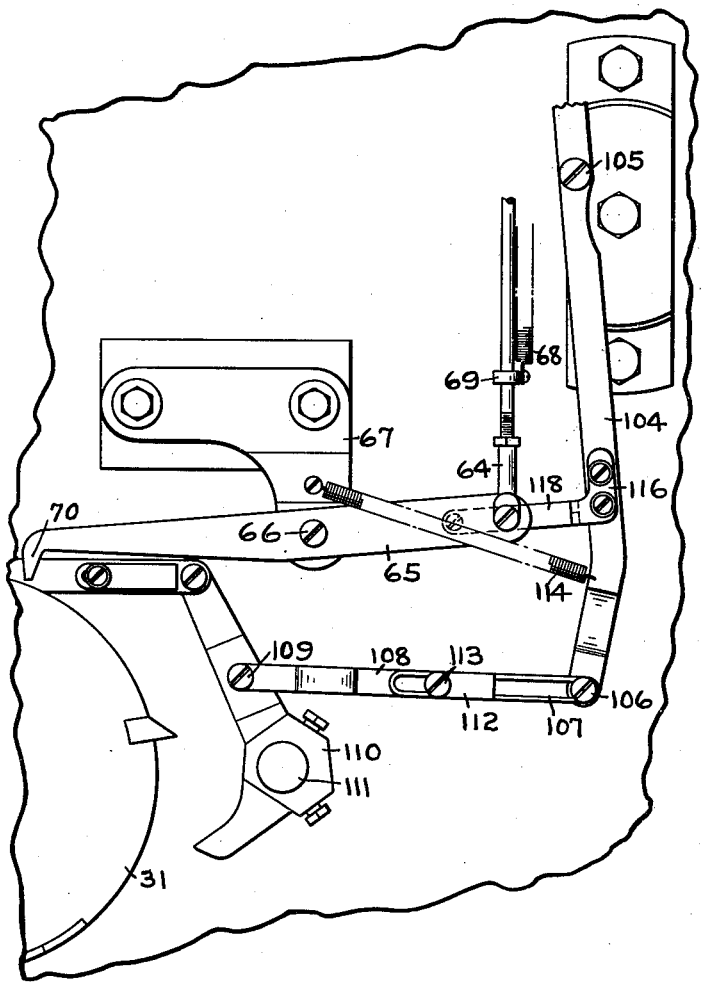
Fig. 12 is an elevation showing in detail part of the mechanism which controls the eyelet closing cam from the kicker.
Figure 13:
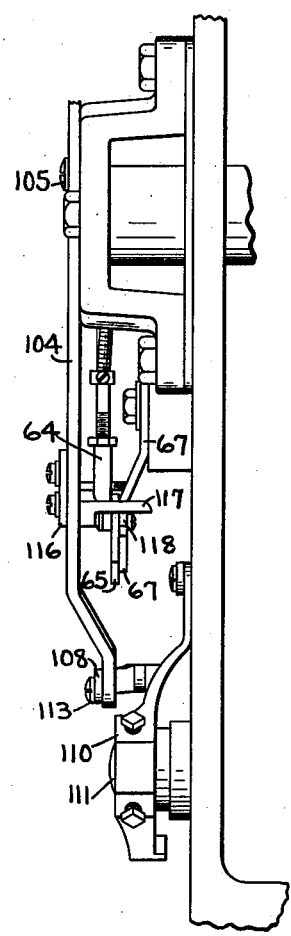
Fig. 13 is an elevation showing the parts on the machine which have been illustrated in Fig. 12, but as they are seen from the back of the machine.

The end of bar 96 has been beveled off as shown at 102, and at certain times, is engaged by a corresponding beveled end 103 of a vertically disposed lever 104. This lever 104 is pivoted at 105 to a fixed portion upon the frame of the machine and a lower part of said lever carries a shouldered screw 106 which engages within an elongated slot 107 in a link 108. This link 108 is pivoted at 109 to one arm of the kicker 110, the purpose and function of which is well known in such machines and will not be described in detail in this application. This kicker is fixed to an extending end of the quadrant shaft 111 which is oscillated throughout a limited angular extent during operation of the machine. An adjustable stop 112 is fastened by a screw 113 to limit the extent of said slot 107 in link 108 and when the kicker is oscillated towards the right (Figs. 3 and 12) or in a clockwise direction, said link will be moved to the right and stop 112 engaging with screw 106 in the end of lever 104 will move that lever against the tension of spring 114 throughout a very small angle. This movement of the lever will be sufficient to move the beveled end 103 at the upper end thereof past the corresponding beveled end of bar 96. During portions of the stocking which are knit while the drum 31 upon the main cam shaft is in a position wherein the toe 70 of lever 65 is riding upon the strip 115 or any one of the cams 71—73, this lever 104 will be continuously swung back and forth by means of kicker 110, link 108 and spring 114.

The movement of said lever 104 as above mentioned is an idle one since the eyelet closing cam is held in an operative position during knitting corresponding portions of the stocking by means of the control from cam drum 24. This continuous movement of said lever goes on throughout the knitting of the high-splice, heel, and the sole and instep or foot portion up to the start of the so-called bunion patch or stepped toe, and it is at this time that the toe 70 on lever 65 will fall off cam 73. It is desirable and in fact essential that the eyelet closing cam be moved in to prevent the formation of a float at the beginning of this bunion patch, however, there has been great difficulty and inconvenience in providing an extra move of the main cam shaft at this particular time so that the mechanism from drum 24 is not available for working said eyelet closing cam at this instant.

An angular attachment 116 has been secured to lever 104 and this angular part has an inwardly extending finger 117, see Figs. 2, 3, 12, 13, and 14. The lever 65 has an extending portion 118 at the end thereof aligned in a vertical plane with said finger 117. As long as the toe 70 of lever 65 is riding upon cams 71—73 or the strip 115 the extension 118 will not be in a position high enough to obstruct the to and fro movement of finger 117 with lever 104, but just as soon as said toe 70 falls off cam 73, the end of lever 65 will raise so that 118 will be in proper position to engage finger 117 as the lower end of lever 104 is moved towards the right (Fig. 3) and thereafter, any movement of link 108 will not affect lever 104 which remains stationary until the toe 70 again rides up on one of the cams mentioned. It is on this last swing of lever 104 prior to its being held stationary that the beveled end 103 thereof will engage the corresponding end 102 of the two-part element to project eyelet closing cam 45 inwardly to a position in which it will engage the long butt jacks. This movement of said cam will be for the purpose of preventing a float at the beginning of the bunion patch. The last movement of the kicker 110 which moved the main cam shaft and pattern drum 31 so that cam 73 moves out from under follower 70 also moves the upper end of lever 104 to the right or to a position such as shown in Fig. 4. This movement of the main cam shaft allowed the double step cam and also the eyelet closing cam to move to inactive position incidental to discontinuing the low sole and entering the bunion patch. The next movement of said kicker toward the right, Fig. 12, will move the upper beveled end 103 of lever 104 past the corresponding beveled end 102 of bar 96 thus moving the eyelet closing cam inwardly at just the proper time to raise one group of butts and their cooperating short butt needles to take yarn at the auxiliary side to prevent formation of a float. It is only necessary to function upon one group of butts since there will be no tendency for a float to form at the opposite side. As lever 104 moves to project said eyelet closing cam inwardly for this brief interval of time, extension 118 will move up to engage finger 117, Figs. 12, 13 and 14, thereby latching said lever in an inactive position until such time as follower 70 shall again be engaged by cam strip 115.

It is frequently desirable to feed a third reinforcing thread to a portion of the high-splice, heel or toe. As shown in Fig. 15, the high-splice may be reinforced throughout a narrow strip and the toe may be reinforced throughout a strip of corresponding width. It is also possible by means of the mechanism shown to carry the reinforcing of the high-splice down into the heel or to make what is commonly termed an "Arrow" reinforcement in the toe, see the patent to Mettler, 1,722,639. In this latter case when widening of the toe is commenced, the third reinforcing yarn is thrown into feeding position and a widening strip of fabric is produced which includes three threads, at any desired time the mechanism for moving said third thread feeding lever into and from feeding position once every course may be brought into play whereupon the reinforcing in the top of the toe will be continued in a width equivalent to that employed in the high-splice.

Referring to Figs. 1, 2, 3, 4, 5 and 6, we will describe the mechanism employed for knitting these reinforcements. For the reinforcement of the "Arrow" type it is necessary to employ a lever 119 pivoted at 120 and having a cam engaging portion 121 which rides up a cam 21' on cam drum 21 at all times except when knitting the widening portion of said reinforcement in a stocking toe.

Lever 122 for controlling the reinforcing yarn guide (not shown), has pivoted at 123, Figs. 3 and 4, a depending link 124 which also connects at its lower end 125 to another lever 126 which is pivoted at about its mid-point on a pin 127 passing through the upper end of a post 128 projecting upwardly from a base portion 129. This base is connected by suitable bolts or screws to a circular base of the machine. Referring to Figs. 2, 3 and 5, a link 130 depends from the outer end of lever 126 to pass downwardly through an opening in the frame to connect at 131 to an arm 132. This arm 132 is fixed to a shaft 133 which is both rotatable and slidable within bearings 134 and 135 on bracket 136. This arm also carries a toe portion 137 which acts as a cam follower whenever the reinforcing guide is to be used.

A disc 138 permanently attached to the "104 gear shaft" 139 has adjustably connected at the outer rim thereof cams which serve to operate upon the toe 137 of lever 132 during reinforcing. Since the "104 gear shaft" makes one complete revolution for every reciprocation of the needle cylinder, two depressions are provided in these cams on disc 138 so that the reinforcing yarn guide will drop into position and be raised therefrom once during each reciprocating stroke of knitting. Each of these cams is comprised of two parts 140 and 141 which overlap at a certain portion 142, this overlapping being essential for the purpose of adjustment of the said cams about the periphery of the disc 138. As these cams are extended to take up a larger angular portion of the complete circumference of the disc, the depressions between the two opposed cams, that is, the complete cam comprising 140 and 141 and that opposite generally designated at 143 will close up the gap or depression between the cams into which follower 137 falls at the reinforcing movement of the guide. By means of this adjustment panels of varying widths may be reinforced in any of the portions of the stocking knitted by reciprocatory work. While it has not been shown in detail, the cam 143 is formed in two parts to be adjustable in the exact manner illustrated with reference to the cam comprising parts 140 and 141.

Whenever the shaft 133 to which lever 132 is attached is moved towards the right into the position shown in Fig. 2, follower 137 will bear upon cams 140, 141, etc., so that the yarn guide for the reinforcing yarn will be moved in and out once during each reciprocation.

The lever 122 has the usual wires depending therefrom and attaching to a finger (not shown) which bears upon certain cams on the main cam drum. This is all clearly shown in U. S. Patent 933,443 and will not be illustrated or described herein. By means of this control from the main cam drum the yarn guide carrying the third reinforcing yarn will be held upwardly out of feeding position at all times except when it is desired to put this third reinforcement into the stocking. At such times lever 132 and follower 137 will be maintained upwardly away from cams 140, etc. At the beginning of the high-splice if it is desired to reinforce therein with a third thread, the control from the main cam drum which holds this reinforcing yarn guide out of action will allow said guide to drop into feeding position whereupon cams 140, 141 and 143 will control said yarn guide to insert the third reinforcing thread throughout a predetermined width of the high-splice. If desired this third reinforcement may be carried down into the heel.

For the production of the so-called "Arrow" toe a cam 21' has been applied to drum 21 and whenever the toe 121 of lever 119 falls off said cam 21', the spindle 133 and elements 132, 137, etc. will be moved bodily to the left, Fig. 2, so that the cams 140, 141 and 143 will have no effect upon the reinforcing yarn guide. This movement takes place at the start of widening in the toe as a general rule, although the reinforcement may be started at other places, and at this time, it will be necessary for the control for said yarn guide on the main cam drum to release that guide for action. The third reinforcing thread will be continuously fed to the toe and will be widened therewith until the toe of lever 119 again rides up on cam 21' to move elements 132 and 137 back into alignment with the reinforcing cams. It is evident that the reinforcing will then continue in a width equivalent to that appearing throughout the high-splice and/or heel. By means of such control as we have described herein a strip of predetermined width can be reinforced with an extra reinforcing thread, or the reinforcement may be continuously fed to a segment of needles to appear throughout the portion of the fabric being knitted.

This axial movement of shaft 133 is brought about by the movement of lever 119 as it is controlled by the cam 21' on drum 21. The free end of lever 119 is provided with a stud 144 through a hole in which rod 145 passes. A spring 146 is attached at its upper end to a fixed part of the machine and at its lower end to lever 119; this spring always tending to draw lever 119 upwardly to swing bell crank lever 147 clockwise about its pivot 148. This bell crank is provided at the upper end of its vertically directed arm with an extension 149 to which a link 150 attaches at 151, said link being slotted for a short distance at 152 and being connected by means of a screw 153 to a lever 154. This lever 154 is attached to the frame of the machine at 155 and is bent forwardly at its upper end at 156 (Fig. 5). The lever is slotted to engage a screw 157 since said lever swings about a pivot at its lower end and the shaft has a movement in a straight line only. The extension 149 at the upper end of bell crank lever 147 projects through to the opposite side of said lever in the form of a cam engaging pin 158. As shown in Fig. 6, this pin either bears against the outer surface of a collar 159 formed on the hub 160, or will pass through the opening 161 in said collar to be guided within the groove 162. When in the outer position, Fig. 6, the spindle 133 and lever 132 are in such a position that said lever is in alignment with the cams which act upon it, but at such times as pin 158 passes through the opening 161 to be guided within groove 162, the parts before mentioned will be in a position in which they do not engage cams to move the reinforcing yarn lever actively.

The rod 145 has two collars 163 and 164 adjustably attached thereto, one collar being above stud 144 while the other is positioned below said stud and also beneath a spring 165 which is under compression between the collar and stud. Whenever lever 119 is moved downwardly for the purpose of swinging bell crank lever 147 in a counter-clockwise direction, Fig. 2, spring 165 will be compressed and the bell crank lever will not move in a direction to push spindle 133 to the left, until pin 158 engages with opening 161 to allow it to enter the groove 162. It can be seen that this provides for an accurate movement of follower 137 to and from cams 140, 141, etc. without providing a cam on drum 21 which will move lever 120 at the precise instant. A hub 160 upon which collar 159 and groove 162 are formed is adjustable upon shaft 139 so that the opening 161 may be rotated around to just the right position to allow pin 158 to change its position from one side of collar 159 to the other at the proper time. When reverse movement is desired the toe 121 of lever 119 will run off cam 21' and there would be a tendency for spring 146 under considerable tension to draw the free end of lever 119 upwardly. This will take place only when the opening 161 rotates to a position opposite pin 158 so that said pin may be passed through from one side to the other.

A hub 166 projects from the frame of the machine and provides a bearing for the extension 139 of the "104 gear shaft". This hub forms a suitable mounting for a bracket arm which projects downwardly at 167, Figs. 1 and 11, and outwardly at 167', Figs. 1 and 6, to receive the screw 148 upon which lever 147 swings. This bracket has a horizontally extending portion 168 which attaches to said hub by means of a screw 169 at the end and another screw 170 which projects outwardly to form a means for attaching the upper end of spring 146.

Figure 16:
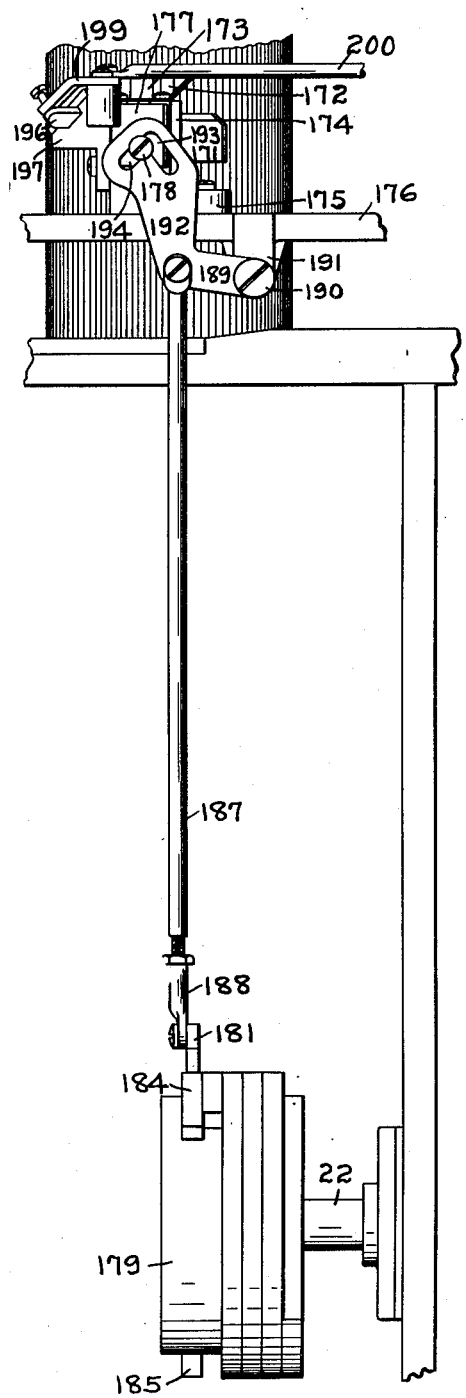
Fig. 16 is an elevation showing a new form of instep cam control and parts associated therewith.
Figure 17:
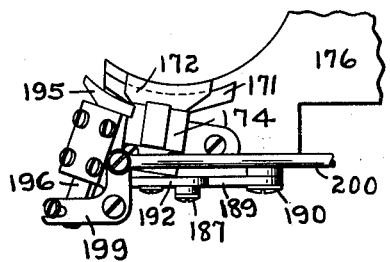
Fig. 17 is a plan view illustrating the modification of instep cam shown in Fig. 16.
Figure 18:
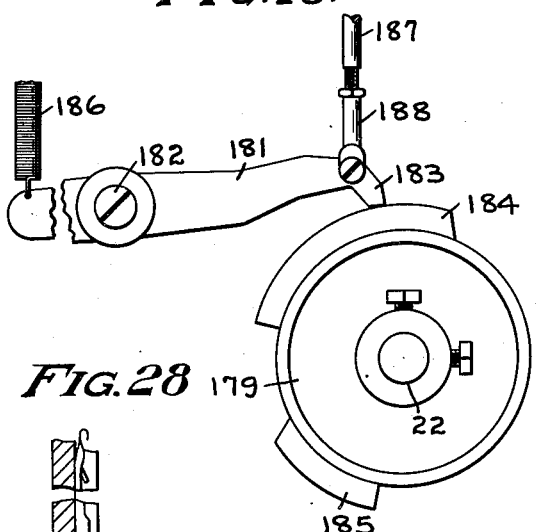
Fig. 18 illustrates in detail the cam control for this modified instep cam.

The usual control for the instep cams has been shown in places where the same is illustrated in Figs. 1 to 8, and this control has been described and claimed in U. S. application Ser. No. 36,563. The lower instep cam is directly operated from the lever which shifts the clutch upon changing from rotary to reciprocatory motion and vice versa; however, it is sometimes desirable that an independent control for this instep cam might be provided so that it may be moved at any desired time regardless of the position of the clutch shifting mechanism. In Figs. 16, 17 and 18 there has been shown a modification in which instep cams are controlled from the main cam shaft. Referring to these figures the lower instep cam 171 is illustrated as being connected to and movable with the upper instep cam 172. This is not an essential feature of the invention since the two cams may be controlled separately, in which case the controlling device herein shown will be used for the lower cam only. These cams are attached to a vertically extending connecting element 173 which is also slidable in a bracket 174 attached at its base 175 to the cam plate 176. A cap 177 attaches to the vertically extending portion 173 at the back thereof and serves to maintain this element in its slot in said bracket and a screw is threaded into this plate and element 173 by means of which screw the cam assembly is moved upwardly or downwardly.

During the fashioning in various parts of the stocking it is essential to move cam plate 176 up and down by means of the usual fashioning cams. Any of the usual direct connections from these cams down to a pattern drum such as the drum 179 on main cam shaft 22, would make it necessary that the cams would be moved up and down whenever the plate 176 was moved for purposes of fashioning. This movement of the cams would interfere with proper needle action during knitting and it is for this reason that the modified control herein shown has been developed.

A lever 181 has been pivoted at 182 and has a toe portion 183 which bears upon the surface of cam drum 179 at all times except when said instep cams are to be in use, and then bears upon cams 184 and 185 which are at the proper location on said cam drum to bring the instep cams into action whenever needed. A spring 186 maintains the toe of the lever in contact with the drum or the cams as the case may be. A vertically disposed rod 187 is attached by means of an adjustable connection 188 at its lower end to lever 181 and at its upper end to a bell crank lever 189 pivoted at 190 to a downwardly extending boss 191 on plate 176. This bell crank lever has an arm 192 which extends upwardly and is flared out at its upper end so that an angular slot 193 may be cut therein. This slot has a portion 194 which is formed on a radius taken with the pivot point 190 as a center so that when the mechanism is in the position shown in Fig. 16, at which time the fashioning movement of plate 176 occurs, the incidental movement of said bell crank lever will not bring about any movement of the instep cams. The bell crank lever will swing about its pivot as the plate 176 is moved up or down but at this time the screw 178 will remain in circumferential slot 194 so that the movement will be ineffective as far as the instep cams are concerned. The cams will be moved, however, at such times as the bell crank lever is swung throughout a greater angle so that pin 178 will pass upwardly or downwardly through slot 193. It may thus be seen that the instep cams will be controlled to change position at any desired time according to cams upon cam drum 179 or other suitable cams or the like, but that no movement of the instep cams will result from the up and down motion which must be imparted to the cam plate and all of the other elements which are necessarily attached thereto. A cam 195 having a stem 196 slidable in an extension 197 connected to bracket 174 is moved in against the cylinder and outwardly at certain desired times by means of a forked bell crank lever 199, link 200 and other mechanism not herein shown since these parts form no essential portion of the invention and are merely shown herein since they are a part of the other mechanism with which we are concerned.

The operation of the machine will now be described, taking for example the complete knitting of the stocking similar to that shown in Fig. 15. This stocking is comprised of a top 201 which is knitted upon the machine but which may be a ribbed top such as is produced in a rib machine and then transferred to the needles of this machine whereupon knitting continues throughout the remainder of the stocking. If a ribbed top is transferred to the needles of the split-foot machine a few courses may be knitted as a ring top. This ring top is not necessary in the stocking illustrated and may be dispensed with in which case the leg portion of the stocking may be knitted directly to the welt or top. After a welt and/or ring top have been knitted, the leg yarn, preferably silk but not necessarily of that material, is thrown in to replace the welt or ring top yarn and the knitting continues throughout the leg 203 until the top of the high-splice is reached. At this point the split portion of the stocking is commenced whereupon the machine is reciprocated to and fro, the high-splice 204 being knitted at the main side of the machine while the instep 205 continues at the auxiliary side being knitted of the same yarn which was fed throughout the leg portion. At the proper time the instep needles are thrown out of action and the heel 206 is knitted at the main side of the machine, the corner of this heel 207 being spaced a few needles away from the suture line 208. After completion of the heel the idle needles are thrown back into action again and knitting continues throughout the foot of the stocking. The instep yarn continues throughout the top of the foot and the sole 209 is knitted at the main side. A few courses before the termination of the foot, the sole which was being knitted on less than one-half the full complement of needles as was the high-splice, is changed so that all of the short butt needles knit in the sole and long butt needles only knit in the top of the foot. This produces the so-called stepped toe or bunion patch 210. A ring toe 211 is knitted by rotary knitting at the main feed, and thereafter, the toe 212 is knitted on all of the short butt needles in the usual manner. As has been shown in the stocking which is herein illustrated, a reinforcement may be knitted at the back of the high-splice and may continue down into the heel if desired. The toe may also be reinforced, preferably at the top thereof as shown in certain modified forms of the stocking illustrated in U. S. application Ser. No. 36,563.

Referring to Figs. 19 through 27 the operation of cams and the path of the needles and jacks will be described throughout these various parts of the stocking shown. The ring top and ring toe are knit of the same yarn, at the same side of the machine and with the same disposition of the cams so that the illustration of Fig. 27 which shows the operation during the ring toe will suffice for illustrating the knitting in the ring top as well. In either instance the center cam 213 at the auxiliary side of the machine is withdrawn and the lower instep cam 214 is also moved from its active position. Knitting is rotary and the entire group of needles passes through the main cam block, taking yarn at the main feed and passing under the auxiliary stitch cams but not taking any yarn nor knitting thereat. The jacks do not enter into play in any active manner during this knitting but merely pass through the machine in an idle pathway wherein they are raised up by cam 39, then pass under cams 43 and 44, then up cam 39' and continue on at that level until they are lowered at 215 being pushed down by the cooperating needles which are drawing stitches at that point.

In Fig. 19 knitting throughout the leg portion of the stocking is shown. There is one movement of the eyelet closing cam 45 on the last rotation of knitting in the ring top, if a ring top is knitted, for the purpose of raising one group of jacks, more specifically the group of jacks which are under the short butt needles adjacent the first long butt needles which will take the leg yarn at the auxiliary side. This eyelet closing cam is projected inwardly to raise these jacks so that their corresponding needles will be raised up high enough to take the auxiliary yarn before the leading long butt needles take the same. This small group of needles would have the ring top yarn which they took at the main side in their hooks when taking the leg yarn so that there will be an overlapping of the two thus preventing an opening or eyelet hole at this point in the stocking. The instep cam 214 is still out of active position and after the last needle has taken the ring top yarn, knitting cam 216 will be withdrawn so that the needles will not clear their latches except at the auxiliary side. Cam 217 is projected inwardly to raise all the needles above knitting cam 218 at their auxiliary side whereupon their latches will be cleared, they will pass down under cam 213 to take the auxiliary yarn and will knit under cam 219. As cam 217 is projected inwardly it automatically raises the cam 220 in a manner which is well known to those skilled in the art. The operation of jacks is exactly the same in the knitting of the leg after eyelet closing cam 45 has been moved inwardly to engage the single group of jacks as mentioned. It only remains in long enough to raise those jacks and their corresponding needles on one revolution. Cam 217 is projected inwardly some time before the leading long butt needle which is to knit at the auxiliary side approaches it but this cam will ride up on the short butts of needles which are passing until the first long butt needle is reached whereupon the cam will move inwardly against the needle cylinder and will raise all needles from that point on. The eyelet closing cam may be moved inwardly to raise both long and short butt jacks, but preferably is only pushed half way in since a few needles are all upon which it is necessary to knit both yarns for purposes of preventing an eyelet.

When the high-splice 204 is reached the necessary movements of the cam shaft and other parts change the motion of the machine from a rotary to a reciprocatory one. If an equal number of needles were to knit in the instep and in the high-splice, or if all long butt needles were to knit in the instep and all short butt needles in the high-splice, it would not be necessary to use any jacks as we do when producing the high-splice upon less than the full complement of short butt needles. The instep is knitted at the auxiliary side of the machine and from the same yarn which was being fed throughout the leg, this instep being knitted upon all the long butt needles and a few short butt needles, for illustration nine needles, on each side of the terminal long butt needles. These nine needles will have a corresponding number of long butt jacks thereunder which serve to make them function in the group of long butt needles. Just prior to entering the high-splice, that is, on the last rotation in the leg, the double stepped cam 48 is projected inwardly by means of cam 71 a sufficient distance to engage long butt jacks. The double stepped cam will remain in just long enough to raise one group of long butt jacks and their needles and will then be retracted. On the first stroke of reciprocation the eyelet closing cam 45 will be moved in half way by means of one of the cams on cam drum 24. This movement of the eyelet closing cam is initially for the purpose of raising the opposite group of long butt jacks so that their needles will knit with the instep needles on the first reciprocation in the high splice. The instep cam 214 was brought into action upon the change-over from rotary to reciprocatory knitting and served to raise those long butt needles which would normally knit the instep anyway. The knitting cam 216 at the main side of the machine is brought into action and cam 217 is withdrawn allowing the cam 220 which is provided for swinging about a horizontal axis at its upper end and being pressed downwardly by a spring all in a manner known and employed in split-foot machines of previous construction. It is to be understood that the eyelet closing cam will remain at its active position for engaging long butt jacks during knitting of the high-splice.

Figs. 20 and 21 show the pathway of needles and long butt jacks in the high-splice during clockwise and counter-clockwise movements respectively. The short butt needles which are knitting the high-splice follow the pathway 221 and pass through the auxiliary cam block under cams 219, 218, over auxiliary raise cam 222, up over raise cam 223 passing by cam 220 which approaches the needle cylinder near enough to engage long butt needles only. These short butt needles then pass through the main cam block, riding up knitting cam 224, under center cam 225, taking yarn at that feed and then knitting under cam 216. The needles are then raised to a normal level on raise cam 226. In Fig. 21 these short butt needles pass through a similar pathway taking yarn at the main feed and knitting under the opposite stitch cam 224. The stitches which are drawn at the main feed remain on the needles and tend to be drawn again at the auxiliary side of the machine but are prevented from being elongated at that auxiliary side of the machine by a peculiar construction of sinkers (not shown) and auxiliary raise cam 222, these novel elements being completely disclosed and claimed in U. S. application Ser. No. 36,563. It is not necessary to use such sinkers and raise cam in this case since other sinkers and cams may be employed with a degree of success, but for the most satisfactory performance these are to be used.

The long butt needles take yarn and knit at the auxiliary side of the machine forming the instep of the stocking and along with these long butt needles the nine needles on either side thereof which have long butt jacks cooperating therewith also draw yarn at the auxiliary side and function in the instep. These long butt needles pass through in pathway 227, Fig. 20, passing under auxiliary center cam 213 to take yarn and knit under stitch cam 218. The short butt needles which have long butt jacks will be approaching the auxiliary cam set in the same pathway 221 in which the other short butt needles are approaching, but if they pass under stitch cam 219, the jacks will pass up eyelet closing cam 45 in the pathway 228 and will raise the needles up to a yarn taking position in the path 229 whereupon said needles knit with the long butt needles at cam 218. After knitting under cam 218 the long butt needls will pass up over a portion of cams 222 and 223 to ride up cam 220 so that they will pass by the main cam set at an elevated and inactive level. Those short butt needles which had long butt jacks and knitted under cam 218 will be raised to this high level as their jacks pass up cam 43. The jacks then pass down under cam 40 so that they will be at a level to engage under cam 43 on the return stroke.

On the counter-clockwise reciprocation, Fig. 21, the long butt needles knit under cam 219 then pass up raise cam 226 and instep cam 214 to be raised above the main cam set. The short butt needles having long butt jacks are caused to knit under this same cam 219 as their jacks pass down under cam 43 up cam 45, then raise their needles to an inactive level along with other long butt needles as they pass up the inside of jack cam 44. These jacks are then lowered by cam 40' just as they were by cam 40 when they passed through in the opposite direction. It has not been shown in Figs. 20 and 21, that the short butt jacks would be passing through and riding up over cams 39, 39' exactly as they do in Fig. 19. This is an idle movement and the pathway is not shown in these figures for purposes of clearness.

The heel is made upon a few less needles than the high-splice, and in this particular description we have taken for example three needles on either side which have short butt jacks thereunder to cast them up into the instep while the heel is being formed; it is not necessary that we should take three needles as any suitable number may be provided with short butt jacks depending upon the size of heel which it is desired to knit or how far the corner of the heel is to be spaced from the suture line. In Fig. 22 the position of cams and pathway of needles and jacks has been illustrated just preparatory to entering the heel. At this time the double stepped cam is projected inwardly for the purpose of raising one set of short butt jacks which were traveling in the pathway 215, and incidentally other long butt jacks which were at a higher elevation so that the short butt needles above these jacks will pass through the main cam block but will not be depressed by knitting cam 224 and will pass upwardly in a path 230 to join the group of long butt needles which are knitting at the auxiliary side. These three short butt needles will take yarn at the auxiliary side before being raised up over cam 214 whereupon they will remain at this inactive level during the knitting of the heel. On this movement eyelet closing cam 45 was also pushed in to its full extent so that it will raise three of the short butt needles on the opposite side to take the instep yarn at the auxiliary feed whereupon their jacks would ride up cam 44 to elevate said three needles to the inactive level. The auxiliary center cam 213 is withdrawn during knitting the heel as is the auxiliary yarn guide. After the heel has been commenced cams 48 and 45 are withdrawn to an inactive position and the jacks merely pass through the machine in an idle pathway.

Figs. 23 and 24 illustrate the knitting operation during the heel wherein all the short butt needles which have no jacks knit at the main side of the machine narrowing and widening in the usual manner to form the heel pocket.

After completing the heel, the instep and sole of the stocking are continued knitting upon the same division of needles which prevailed during knitting of the high-splice and instep. Fig. 25 illustrates this action of needles and jacks in the sole and may be directly compared with Figs. 20 and 21 which illustrate the similar action in the high-splice, only one direction of knitting being indicated for the sole. The idle pathway of short butt jacks is also shown at 215 in this Fig. 25 since it was omitted for purposes of clearness in Figs. 20 and 21. While this has not been illustrated as a separate step the upper instep cam 231 would be projected inwardly to lower all needles which were raised to inactive position whereupon cam 45 would again be projected in to its intermediate position for the purpose of controlling long butt jacks and their needles in a manner previously described with reference to Figs. 20 and 21. The sole may be made of the same yarn as that used in the high-splice, or it may be desirable to use more than one yarn throughout the knitting of the sole for purposes of reinforcing the same.

A few courses before the completion of the foot portion, that is, the sole and instep, the use of jacks to control a certain few of the short butt needles to knit with long butt needles is dispensed with and cam 45 is withdrawn to an inactive position, Fig. 26. This will result in the production of a so-called stepped tone or bunion patch wherein each portion of the split fabric is formed upon an equal division of needles. If the original division of needles had been other than an equal one, this portion of the stocking would be formed upon all of the long butt needles knitting in the top while all short butt needles would knit in the sole.

It is at this particular time that the eyelet closing cam is moved by means of the mechanism which connects it with the kicker. In order to prevent a short float on one side of the stocking when starting the bunion patch, the eyelet closing cam is projected inwardly to raise one group of jacks. Just as the toe 70 of lever 65, Fig. 3, drops off cam 73 the lever 104 will be given one movement to the left, Fig. 12, to project this cam 45 inwardly at the proper instant.

The ring toe 211 is knitted in a circular manner on all the needles and at the main side of the machine. Auxiliary center cam 213 and instep cam 214 are withdrawn from active position and the diagrammatic illustration of the knitting during this part of the cycle corresponds to that which was described with relation to the ring top, see Fig. 27. At the beginning of this ring toe or upon change of yarn, the eyelet closing cam is again moved inwardly to engage one group of jacks, preferably but not necessarily the long butt jacks, this being for the prevention of an eyelet in the stocking at the particular juncture between the foot and ring toe. A cam 89', Fig. 11, moves the eyelet closing cam at this time.

The toe of the stocking is knitted in the usual manner upon the short butt needles knitting at the main side of the machine and loopers rounds may be knitted in extension of the toe for the usual purpose. While we have described the knitting of this stocking from top to toe, it may be seen that the same could be knitted beginning at the toe in which case, the sequence of operations would merely be reversed.

The invention has been described somewhat specifically for the purpose of illustrating the same and it is to be understood that we are not limited to the exact mechanism shown, nor to any particular division of long and short butt needles or jacks. Within reasonable limits the suture line may be varied to produce a very narrow high-splice and/or sole or either of these parts of the stocking may be produced closely adjacent the center line of said stocking if desired. The heel may be varied in its size and the number of wales which divide the corner of the heel from the suture may be varied within a reasonable degree. All of these jacks may be used during the knitting of most of the high-splice and sole whereupon the corner of the heel would coincide with the suture line and just prior to entering the heel and for a few courses after completing the same, only long butt jacks may be used whereupon a reinforcement will be knitted at the corner of said heel and upon the instep side of the suture. This is a particular set up which has been very difficult to produce upon previous split-foot machines but is made with comparative ease on the machine herein disclosed.

The description and illustration in this case are to be considered as illustrative of the invention only, and many modifications may occur to those skilled in the art without departing from the scope of the original invention which is defined in the appended claims.

We claim:

1. A split-foot knitting machine having one group of needles provided with long butts and another group of needles provided with short butts, jacks cooperating with some of the short butt needles to make them knit on the side of the long butts when desired, a pair of fixed cams beneath which said jacks may pass and a movable cam between the pair of fixed cams for raising jacks which pass beneath one of the fixed cams up to yarn taking position whereupon said jacks will pass up the inner side of the other fixed cam.

2. A split-foot knitting machine wherein opposite sides of the split fabric are knitted upon groups of needles having butts of different lengths, jacks under some of the needles for selectively causing them to knit on either one side or the other, opposed sets of fixed cams through which said jacks pass in alternate directions, said fixed cams comprising upper and lower leveling cams and a pair of opposed, inclined cams for lowering jacks or for raising them according to a predetermined selection.

3. Jack controlling cams for split-foot knitting machines including a pair of opposed, inclined cams, other cams for raising jack butts above the lowermost extremity of said inclined cams and still other fixed cams for lowering jack butts below the upper extent of said inclined cams.

4. A cam unit for controlling butts of knitting instrumentalities in knitting machines including a supporting element, an inclined cam fixed to said element, a cam fixed at the lower portion of said supporting element for raising butts above the lower end of said inclined cam and a third cam fixed to said element for guiding butts into engagement with the upper end of said inclined cam.

5. A unitary cam set for attaching to a knitting machine comprising a supporting block, an inclined cam provided with a horizontal lower extension fixed to said block, a triangular shaped cam fixed to the lower part of said block and having its upper projection above the lower horizontal extension on said inclined cam and a second triangular shaped cam fixed to the upper part of said block in opposition to the lower triangular shaped cam, the lowermost part of this second cam being maintained at a level below the top-most extent of said inclined cam.

6. A split-foot knitting machine having therein jacks for controlling needles at certain predetermined times, means for actuating said jacks comprising two opposed groups of fixed cams, a movable cam capable of being brought into action between said fixed cams and a second movable cam individually actuated according to pattern means on the other side of said fixed cams.

7. A split-foot knitting machine having jacks therein which are to be selectively actuated at certain predetermined intervals, means for controlling said jacks to function upon needles or not to function upon needles at any predetermined times comprising two opposed, inclined cams fixed to a supporting element on the base of said machine, other fixed cams cooperating with said inclined cams and a movable cam between said inclined cams, this movable cam being capable of movement to and from active position according to predetermined pattern requirement whereby said jacks may be selectively controlled for passing below both inclined cams or below one of said cams and upwardly on the inside of the other of said cams.

8. A split-foot knitting machine having jacks therein which are to be selectively actuated at certain predetermined intervals, means for controlling said jacks including a pair of opposed, inclined cams which are mounted in fixed position, a movable cam between said inclined cams which when in position to engage jacks, will raise jacks which have passed down beneath one of the inclined cams up into a yarn taking position and then on to the inner surface of the other inclined cam, a lever for moving said movable cam into position and cam means acting upon said lever for moving it from one position to the other.

9. A split-foot knitting machine having jacks therein which are to be selectively actuated at certain predetermined intervals, means for controlling said jacks including a pair of opposed inclined cams which are mounted in fixed position, a movable cam between said inclined cams which when in position to engage jacks, will raise jacks which have passed down beneath one of the inclined cams up into a yarn taking position and then on to the inner surface of the other inclined cam, a lever for moving said movable cam into position and cam means acting upon said lever for moving it from one position to the other and a second operating means for said cam to move it into operative position, said second means receiving its movement from an entirely different source from that which brings about the movement of the first cam means mentioned.

10. A split-foot knitting machine having jacks therein which are to be selectively actuated, means for controlling said jacks to function upon needles at predetermined intervals including fixed cams through which said jacks are compelled to pass either in one pathway or in another, and a movable cam between said fixed cams for determining which of the pathways said jacks will pass through, means for moving said movable cam into position including a lever and cam means operating upon said lever to move it from one position to another, said cam means being formed into a series of steps whereby said movable cam may be controlled to engage jacks with butts of different lengths.

11. A split-foot knitting machine having jacks therein which are to be selectively actuated at certain predetermined intervals, means for controlling said jacks to function at these predetermined intervals according to pattern requirement including fixed cams through which said jacks pass in one of two distinct pathways and a movable cam between said fixed cams for determining which pathway said jacks will pass through, a lever upon which said movable cam is mounted and a bar connected to said lever having at the end opposite that which connects to said lever an inclined surface, an oscillating lever pivoted to said machine and having a cooperating inclined surface at its upper end for engagement with that inclined surface on said bar and stop means functioning upon said oscillating lever for holding it out of engagement with the end of the bar.

12. Mechanism as described in claim 11, wherein said oscillating lever is moved by means of a link connected to the kicker of said machine and the stopping means before mentioned consisting of a finger attached to said oscillating lever and a cooperating portion of a lever which is independently moved from cams on one of the cam shafts of the machine in such timed relation that said finger will bear upon the extension on said lever at certain predetermined intervals.

13. In a knitting machine the combination of a yarn guiding finger movable to and from feeding position and means for moving said finger to and from said position once during each course of knitting, said means including cams and a follower for conveying the motion imparted by said cams to said finger, means for moving said follower on to and away from said cams including resilient means, a movable link with a pin at one end thereof, and a collar with a slot therein for guiding said pin from one side of said collar to the other, pattern controlled means for compressing the resilient means adapted to force said pin from one side of the collar to the other whereupon said pattern controlled means may be moved before the desired change is to be brought about and said follower will be moved to or from its cams whenever said pin is allowed to pass through the slot in said collar.

14. A method of split-foot knitting wherein some needles are controlled by jacks to knit on one side of the machine at times and at the opposite side of the machine at other times, including the steps of passing said jacks in alternate directions thru opposed sets of fixed jack raising and lowering cams and selectively controlling the path which said jacks take through said cams.

15. A method of split-foot knitting wherein some needles are controlled by jacks to knit on one side of the machine at times and at the opposite sides of the machine at other times, including the steps of passing jacks selectively above and below fixed cams and controlling a movable cam between said fixed cams to change the pathway of jacks through said fixed cams and controlling said movable cam by pattern means so as to guide said jacks to and from one pathway or the other as desired.

16. In a knitting machine the combination of a rotating needle carrier and needles therein, cams for actuating needles when in one position and in another position being ineffective upon said needles, a cam support movable along the length of said carrier upon which said cams are mounted, means for moving said cams from one position to another, said means functioning from parts of the machine not movable with said support but wherein the control of said cams is not influenced by the movement of the support.

17. In a knitting machine the combination of a rotating needle carrier and needles therein, cams for actuating needles when in one position which are ineffective upon said needles when in another position, a cam support movable lengthwise of the carrier upon which said cams are mounted, means for moving said cams from one position to another connected to means engageable with a pattern drum upon another part of the machine, said first mentioned means being so constructed that movements of the support relative to the drum do not bring about any movement of said cams.

18. In a knitting machine the combination of a rotating needle carrier and needles therein, a cam support movable lengthwise of said needles and carrier and having fixed thereto cams which are relatively movable upon said support from an active to an inactive position, a lever pivoted to said support and having one slot therein radial to said pivot and another slot in continuance of said radial slot being formed concentrically to said pivot, a pin extending from said cams through said slots and means for rocking said lever about its pivot.

19. In a knitting machine the combination of a rotating needle carrier and the needles therein, a cam support movable lengthwise of said carrier and needles and having a cam slidably mounted thereon, a lever pivoted to said support having a slot therein for engagement with a pin projecting from said cam by means of which slots said cam may be moved from an active to an inactive position, said slot being formed in two continuous parts one such part being radial to the pivot point of said lever and the other part of said cam slot being concentric to said point whereby movements of the lever while the pin is within said concentric slot will not effect any movement of said cam but when in said radial slot will move said cam from one extreme position to the other.

20. In a knitting machine the combination of a rotating needle carrier and needles therein, a support movable vertically within said machine or lengthwise of said needles and support, a bracket fixed to said support having a connected pair of instep cams vertically slidable therein, a lever pivoted to said support having a slot therein engaging with a pin projecting from said vertically slidable instep cams, a pattern drum upon the main cam shaft of said knitting machine and connecting means between said pattern drum and lever for transmitting movements from cams on said drum to the lever, said lever having the slot therein formed in two continuing portions one of these portions being substantially radial to the point upon which said lever pivots and the other part of said slot being substantially concentric to the pivot point before mentioned.

21. A split-foot knitting machine having therein groups of needles adapted to knit opposite sides of a split fabric, said groups of needles having butts of two lengths, long butts in one group and short butts in the opposite group, jacks under some of the needles in one of the groups for selectively causing them to knit at either one side or the other of said machine, fixed cams through which said jacks pass and constructed to cause jacks to raise cooperating needles to and from one of the groups to the other group, and a movable cam for determining into which of these groups said fixed cams will cause jacks to move their respective needles.

ROBERT H. LAWSON.
ARTHUR N. CLOUTIER.